J. F. FIELD.
FOUNDATION FOR TRUCK BODIES.
APPLICATION FILED MAY 9, 1919.
1,322,887.
Patented Nov. 25, 1919.
3 SHEETS—SHEET 1.
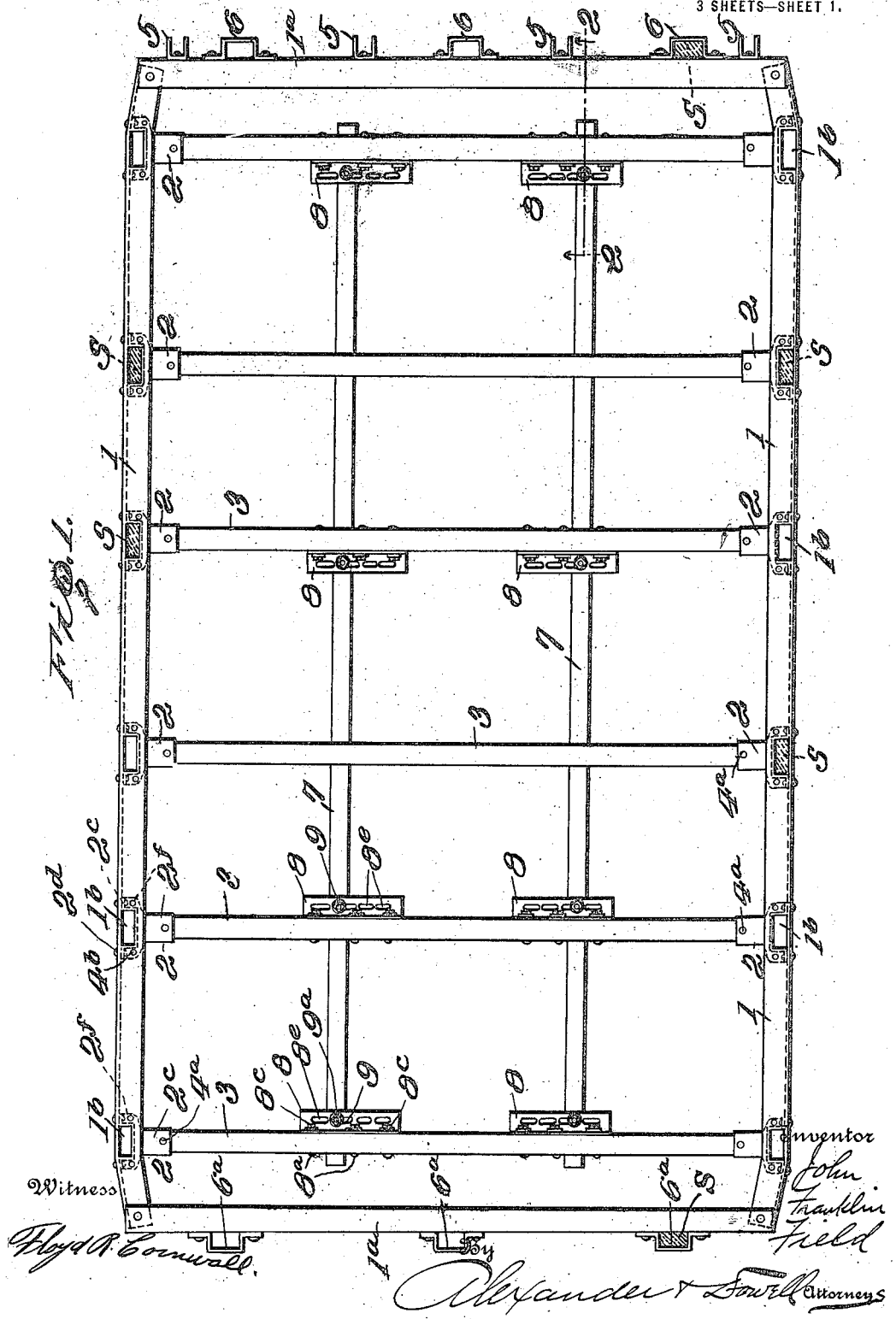

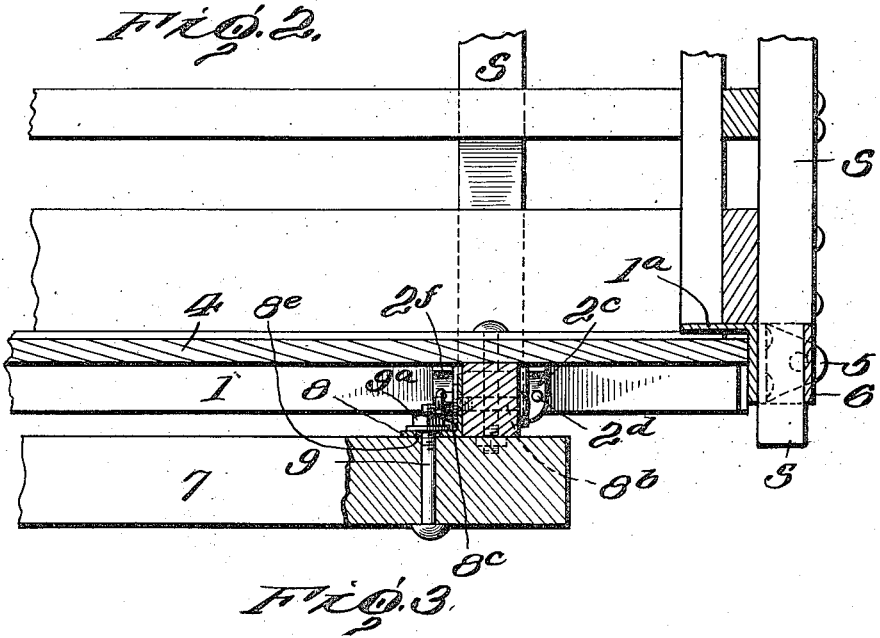
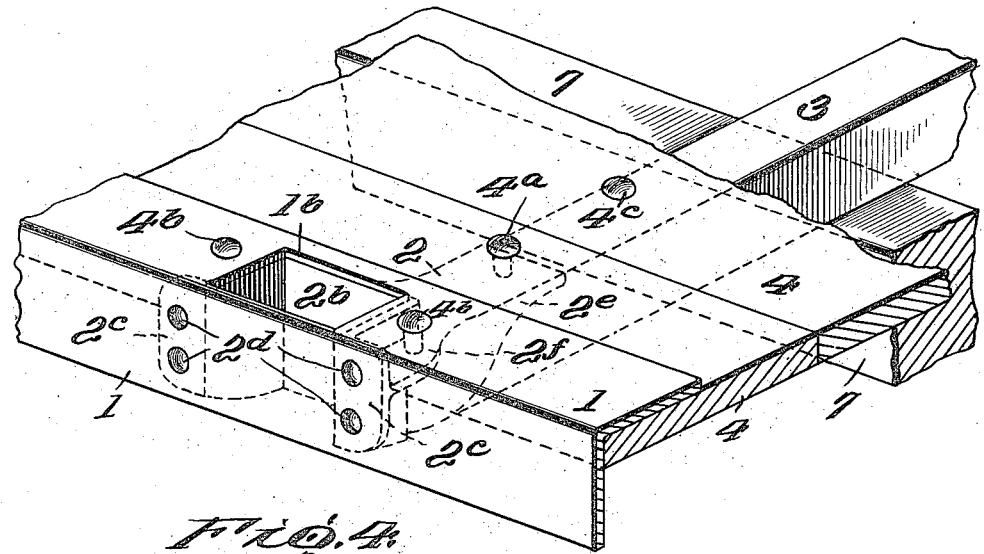
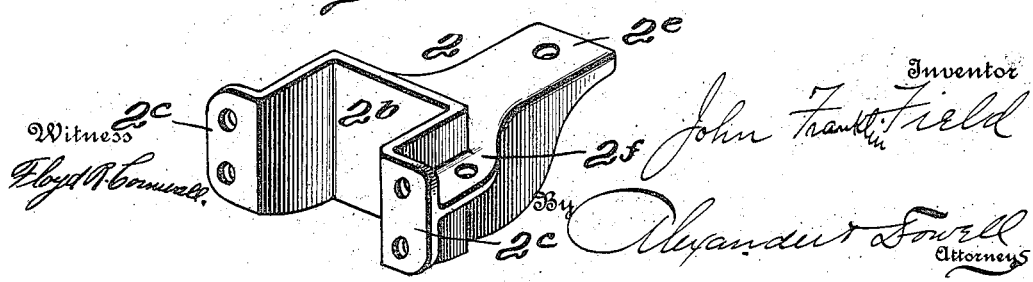

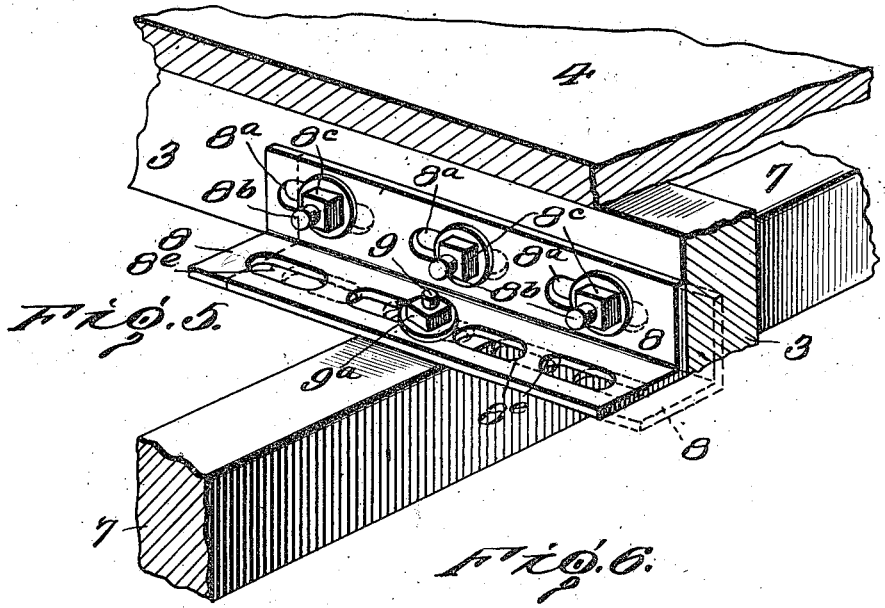
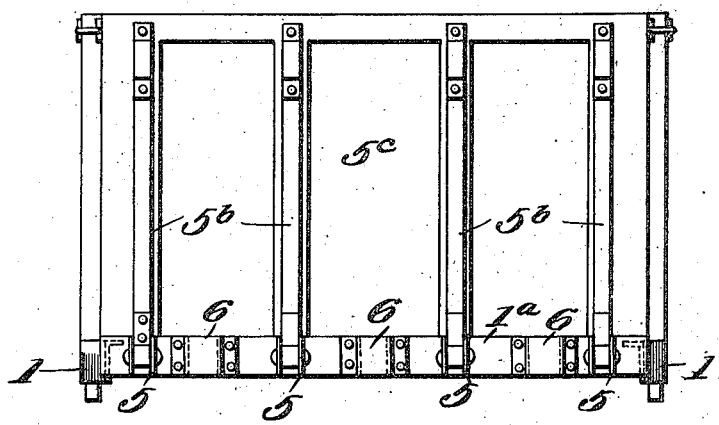
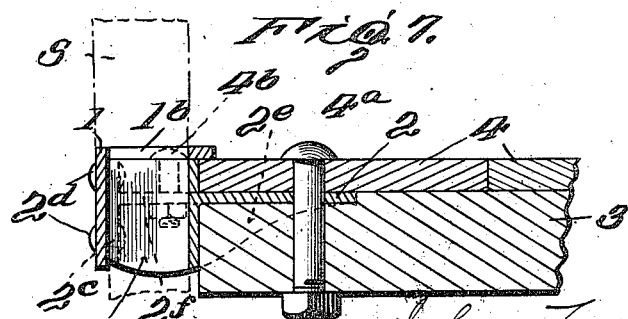

UNITED STATES PATENT OFFICE.

JOHN FRANKLIN FIELD, OF OWOSSO, MICHIGAN.

FOUNDATION FOR TRUCK-BODIES.

1,322,887.     Specification of Letters Patent.     Patented Nov. 25, 1919.

Application filed May 9, 1919. Serial No. 295,951.

*To all whom it may concern:*

Be it known that I, JOHN FRANKLIN FIELD, a citizen of the United States, residing at Owosso, in the county of Shiawassee and State of Michigan, have invented certain new and useful Improvements in Foundations for Truck-Bodies; and I hereby declare that the following is a full, clear, and exact description thereof, reference being had to the accompanying drawings, which form part of this specification.

This invention relates to truck bodies and especially to those for automobile delivery trucks.

The principal object of the invention is to provide a substantial truck-body-foundation which can be used as the basis of bodies of various types, and is so constructed and designed that any kind of special superstructure of body can be built or erected upon this foundation by simply attaching the side and end members of such special body to the foundation.

For this purpose the foundation is so formed—and the side and end members of the several special bodies so constructed in relation to the foundation,—that the several side and end members of different forms of bodies can be interchangeably fitted upon and connected to such foundation, so as to constitute therewith a complete body of any particular form desired; the foundation forming the substantial base or floor portion of each different kind of body. Thus the invention enables a truck owner, by providing the proper side and end members of different bodies, to readily equip his truck with any specific type of body desired, without having to alter or remove the foundation structure.

Another object of the invention is to provide a very substantial, strong, truck-body foundation, which is novel as a whole, and also contains various novel subsidiary parts or elements as hereinafter pointed out.

A further object of the invention is to enable the foundation structure to be readily mounted upon and secured to truck chassis of different or various widths, and for this purpose the invention includes means for adjustably connecting the sub-sills to the bolsters of the foundation so that the sub-sills can be readily adjusted nearer to or farther from each other to suit the width of the truck chassis upon which the foundation is to be mounted.

I will explain the invention with reference to the accompanying drawings which represent a practical truck foundation embodying the invention and the various novel features thereof:

The essentials of the invention and the various novel features of construction and novel combinations of parts for which protection is desired are summarized in the claims following the description.

In the drawings Figure 1 is a top plan view of the foundation structure, with the flooring removed, and showing the sub-sills and connecting devices.

Fig. 2 is an enlarged detail sectional view on the line 2—2 Fig. 1, and indicating part of one form of truck body which could be used with the foundation.

Fig. 3 is an enlarged perspective view illustrating the connection between a socket-casting, side member, bolster, and flooring.

Fig. 4 is an enlarged view of one of the socket-castings detached.

Fig. 5 is an enlarged perspective view of one of the adjustable connections between the bolsters and sub-sills.

Fig. 6 is a reduced end elevation of a truck indicating another type of truck body mounted on the foundation.

Fig. 7 is an enlarged detail sectional view through one of the socket castings and its connections to the frame and bolster.

The truck foundation constitutes the bottom of and support for any desired truck body, and comprises an exterior rectangular frame composed of side bars 1 and end bars 1ª. These bars are preferably made of L-angle irons so arranged that one flange lies uppermost and horizontal, and the other flange stands vertical and outermost. The side and end bars of the foundation are rigidly connected, at the corners of the truck frame by bolts, rivets or other suitable fastenings. The side bars 1 are provided with slots 1ᵇ in their top flanges for engagement of the end of the standards or stakes S, which support or form part of the side members of any desired style of body.

A plurality of stake pocket-castings 2 are secured to each bar 1. Each pocket casting 2 is approximately Y-shaped in plan view and is shown—(see Fig. 4)—as provided with a recess $2^b$ in its outer end corresponding in size to the opening $1^b$ in the side bar 1. At each side of the recess $2^b$ the stake-pocket-casting has outwardly projecting flanges $2^c$ which abut against the inner face of the vertical flange of the bar 1, and are secured thereto by bolts or rivets $2^d$, as indicated in the drawings; and from the pocket $2^b$ the casting has an inwardly extending shank $2^e$, which is approximately U-shaped in cross-section and is adapted to fit over the end of the adjacent bolster 3. The shank $2^e$ preferably lies below the plane of the upper edges of the flange $2^c$ a distance corresponding to the thickness of the flooring 4 of the foundation.

The flooring 4 is preferably made of wood and extends longitudinally of the foundation between the end bars $1^a$; the ends of the flooring 4 being fitted under the top flanges of the bars $1^a$, and the outer sides of the side members of the flooring being fitted under the top flanges of the side bars 1, and overlying the bolsters and the shanks $2^e$ of the stake-pocket-castings 2.

The flooring 4 is preferably secured to the bolsters by bolts $4^a$, $4^b$, $4^c$. The bolts $4^a$ pass through the flooring, the shank $2^e$ of the stake-pocket castings, and the bolster; rigidly bonding them together. The bolts $4^b$ pass through the top flanges of the side angle bars 1, the flooring, and web portions $2^f$ of the stake pocket castings, as indicated in the drawings. The bolts $4^c$ secure the intermediate portions of the flooring to the bolsters.

It will be seen that the bolsters and stake-pocket-castings thus applied and united firmly bond the opposite side bars 1 of the frame together, and also stiffen the side bars at the points where the body standards S are engaged with the pockets; and a sufficient number of bolsters and stake pockets are provided to give the desired strength and rigidity to the foundation.

To the rear end bar $1^a$ may be rigidly secured a set of suitably spaced hinge-castings 5; to which can be pivoted the hinge straps $5^b$ of the end door member $5^c$ of any style of body which has a hinged end door, such for example, as indicated in Fig. 6.

To this rear end bar $1^a$ are also secured a set of suitably spaced socket castings 6 which may be engaged by the lower ends of the stakes of the rear end member of any style of body which does not have a hinged gate; for example, a crate body as indicated in Fig. 2.

The front end bar $1^a$ of the foundation may be provided with spaced socket-castings $6^a$, similar to the castings 6, for the engagement of standards on the front end member of the body of whatever type that may be used with the foundation. Some of these standards are indicated in Fig. 1.

The bolsters of the foundation are supported upon sub-sills 7 which extend longitudinally of the body and may be of metal or timber.

In order to enable the foundation to be readily mounted upon the chassis of any make of automobile it is desirable to have the sub-sills 7 adjustable toward or from each other, so that they can be properly fited on chassis of different widths. For this purpose I use slotted angle-iron connectors 8 to fasten the sub-sills to the bolsters. The connectors 8 are secured to, and longitudinally of, the bolsters over, and transversely of, the sub-sills 8. Each connector is so disposed that one flange thereof fits against the side of the adjacent bolster, and the other flange thereof rests upon and extends along the top of the underlying sub-sill. As shown connector 8 is fastened to the bolster by bolts $8^b$ which engage the bolster and extend through slots $8^a$ in the vertical flange of the connector and are secured by nuts $8^c$. The connector is secured to the adjacent sub-sill by means of a bolt 9 engaging the sub-sill and extending through one of a series of slots $8^e$ in the horizontal flange of the connector, and secured thereto by a nut $9^a$.

The slots $8^a$ and $8^e$ in the connectors permit them to be readily adjusted to securely fasten the bolsters to the sub-sills; and enable the sub-sills to be readily adjusted to exactly fit a chassis. If it should happen that when the sub-sills are properly adjusted to suit a particular chassis the bolts 9 in the sub-sills would come opposite web portions between adjacent slots $9^e$ in the connectors, the connectors could be adjusted longitudinally of the bolster, by reason of the slots $8^a$, until the bolts 9 could be properly engaged with the slots $8^e$. The slots thus enable the connectors to be adjusted so that the sub-sills can be exactly fitted to any width of chassis, and at the same time properly secured to the sills and bolster.

What I claim is:

1. A truck body foundation having an outer metal frame comprising side and end bars; socket-castings within the margins of the frame and attached to the inner sides of the side bars for engagement of body-standards; and bolsters extending between the side bars and connected with said socket castings to bond the side members together.

2. A truck body foundation having an outer metal frame comprising side and end bars; socket-castings attached to the side bars for engagement of body standards; socket castings attached to the front and rear end bars for the engagement of body standards; hinge-castings attached to the rear end bar; and bolsters extending between the side bars and connected with said socket castings to bond the side members together.

3. A truck body foundation comprising side and end bars formed of L-angle irons arranged with one flange horizontal and uppermost and the other flange vertical and outermost, the side bars having socket openings in their upper flanges for the engagement of body-standards; socket castings attached to the side bars beneath the openings therein and having recesses corresponding to the openings in said bars; and bolsters extending between the side bars and connected with said socket castings to bond the side bars together.

4. A truck body foundation comprising side and end bars formed of L-angle irons arranged with one flange horizontal and uppermost and the other flange vertical and outermost, the side bars having openings in their upper flanges for the engagement of body standards; socket castings attached to the front and rear end bars for the engagement of body standards; socket castings attached to the side bars beneath the openings therein and having recesses corresponding to the openings in said bars; and bolsters extending between the side bars and connected with said socket castings to bond the side bars together.

5. A truck body foundation comprising side and end bars formed of L-angle irons arranged with one flange horizontal and uppermost and the other flange vertical and outermost, the side bars having openings in their upper flanges for the engagement of body standards; socket castings attached to the front and rear end bars for the engagement of body standards; and hinge castings attached to the rear end bar; socket castings attached to the side bars beneath the openings therein and having recesses corresponding to the openings in said bars and provided with inwardly projecting shanks.

6. A truck body foundation having an outer metal frame comprising end bars and angle-iron side bars arranged with their outermost flanges vertical; socket-castings attached to the inner sides of the outermost flanges of the side bars for engagement of body-standards; and bolsters extending between the side bars and connected with said socket castings to bond the side bars together.

7. A truck body foundation having an outer metal frame comprising end bars and angle-iron side bars arranged with their outer flanges vertical and having socket openings in their horizontal flanges; and socket-castings attached to the inner sides of the vertical flanges of the side bars and having recesses registering with the said openings for engagement of body-standards.

8. A truck body foundation comprising end bars and angle-iron side bars arranged with their outermost flanges vertical, and having socket openings in their top flanges for the engagement of body standards; socket-castings attached to the inner sides of the vertical flanges of the side bars and having recesses corresponding to the openings in said bars; and bolsters extending between the side bars to bond them together.

9. A truck body foundation comprising end bars and L-shaped side bars arranged with their outer flanges vertical and having socket openings in their upper flanges for the engagement of body standards; socket-castings attached to the inner sides of the vertical flanges of the side bars and having recesses corresponding to the openings in said bars; and bolsters extending between the side bars and connected to said socket-castings to bond the side bars together; substantially as described.

10. A truck body foundation comprising end bars and angle-iron metal side bars arranged with their outer flanges vertical and the other flange horizontal, the horizontal flange having socket openings for the engagement of body standards; socket-castings attached to the inner sides of the vertical flanges of the side bars, each socket-casting having a recess corresponding to an opening in said side bars and an inwardly extending shank; and bolsters extending between the side bars and connected with the shanks of opposite socket-castings to bond the side members together.

11. In combination, a truck body foundation comprising side and end bars formed of angle-irons arranged with the outer flanges vertical and the other flanges horizontal, the horizontal flanges of the side bars having socket openings for the engagement of body standards; socket-castings attached to the end bars; socket-castings attached to the inner sides of the vertical flanges of the side bars and having recesses corresponding to the openings in said bars and provided with inwardly projecting shanks; and bolsters extending between the side bars and connected with the shanks of said socket-castings to bond the side bars together; with interchangeable body members having standards adapted to engage the sockets of the foundation, whereby the foundation may be used as the base of any desired type of body.

12. For a truck foundation, a socket casting having a recess in its outer face open at its outer side for the engagement of a standard, and lateral flanges at each side of the recess for attachment to the side member of a truck frame, the outer side of the pocket being closed by the side member of a truck frame when the casting is attached thereto, and said casting having an inwardly projecting shank portion extending from the rear side wall of the recess for connection with a bolster of a truck frame.

In testimony that I claim the foregoing as my own, I affix my signature.

JOHN FRANKLIN FIELD.